US 6,584,377 B2
Jun. 24, 2003

(54) LEGGED ROBOT AND METHOD FOR TEACHING MOTIONS THEREOF

(75) Inventors: Hiroki Saijo, Chiba (JP); Yoshihiro Kuroki, Kanagawa (JP)

(73) Assignee: Sony Corporation, Tokyo (JP)

( * ) Notice: Subject to any disclaimer, the term of this patent is extended or adjusted under 35 U.S.C. 154(b) by 64 days.

(21) Appl. No.: 09/854,772

(22) Filed: May 14, 2001

(65) Prior Publication Data

US 2002/0061504 A1 May 23, 2002

(30) Foreign Application Priority Data

May 15, 2000 (JP) ........................................ 2000-141798

(51) Int. Cl.$^7$ .............................................. G06F 19/00
(52) U.S. Cl. ........................ 700/245; 700/132; 700/133; 700/246; 700/247; 700/251; 700/253; 700/256; 700/260; 700/261; 318/561; 318/568.1; 318/568.12; 318/568.11; 318/568.16; 318/568.17; 318/568.2; 901/1; 901/9; 901/46; 901/47; 701/23
(58) Field of Search ............................. 700/245, 131, 700/132, 246, 247, 251, 253, 256, 260, 261; 318/561, 568.1, 568.12, 568.11, 568.16, 568.17, 568.2; 701/23; 901/1, 9, 46, 47

(56) References Cited

U.S. PATENT DOCUMENTS

| 5,369,346 A | * 11/1994 | Takahashi et al. | ........... 700/131 |
| 5,586,224 A | * 12/1996 | Kunii et al. | ................. 700/132 |
| 5,623,428 A | * 4/1997 | Kunii et al. | ................. 345/473 |
| 5,625,577 A | * 4/1997 | Kunii et al. | ................. 318/561 |
| 5,808,433 A | * 9/1998 | Tagami et al. | ................ 180/8.6 |
| 5,872,893 A | * 2/1999 | Takenaka et al. | ............. 180/8.6 |
| 5,936,367 A | * 8/1999 | Takenaka | .................... 180/8.6 |
| 6,064,167 A | * 5/2000 | Takenaka et al. | ...... 318/568.12 |
| 6,243,623 B1 | * 6/2001 | Takenaka et al. | ............. 180/8.1 |
| 6,266,576 B1 | * 7/2001 | Okada et al. | .......... 318/568.12 |
| 6,301,524 B1 | * 10/2001 | Takenaka | ............... 318/568.12 |
| 6,317,652 B1 | * 11/2001 | Osada | ...................... 318/568.1 |

OTHER PUBLICATIONS

Kim et al., Development of a Humanoid Robot CENTAUR—Design, humand interface, planning and control of its upper–body–, 1999, IEEE, pp. IV–948–IV–953.*
Kagami et al., Desing and implementation of remote operation interface for humanoid robot, 2001, IEEE, pp. 401–406.*
Guzzoni et al., Many robots make short work, 1996, Internet, pp. 1–9.*
Integrated vision speech, & action, 1994, Internet, pp.*
Scientific american Frontiers, Integrated vision speech, & Action, 1994, Internet, pp. 1–2.*
Hirai et al., The development of Honda Humanoid robot, 1998, IEEE, pp. 1321–1326.*
Chen et al., Gesture–speech base HMI for a rehabilitation robot, 1996, IEEE, pp. 29–36.*

(List continued on next page.)

*Primary Examiner*—William A. Cuchlinski, Jr.
*Assistant Examiner*—McDieunel Marc
(74) *Attorney, Agent, or Firm*—Frommer Lawrence & Haug LLP; William S. Frommer

(57) ABSTRACT

A legged robot is provided with a plurality of basic motion programs. The legged robot can produce a teaching motion program for performing a series of expressive motions by recognizing and language-processing instructions from a user in the form of voice-input, and extracting and combining at least one basic motion in a time series. More sophisticated and complex teaching programs can be edited by controlling the produced teaching motion programs stored in a database and combining the teaching motion programs with the basic motion programs.

16 Claims, 9 Drawing Sheets

OTHER PUBLICATIONS

Horowitz et al. The structure adn function of a speech control language for text processin and robotic control, 1989, IEEE, pp. 1–3.*

Baerveldt, Cooperation between man and robot: Interface and safety, 1992, Internet/IEEE, pp. 183–187.*

Brown et al., SAM: A perceptive spoken language understanding robot, 1992, IEEE, pp. 1390–1402.*

Franklin et al, "Happy patrons make better tippers" Creating a robot waiter using perseus and the animate agent architecture, 1996, Internet, pp. 1–6.*

Crangle et al., Language and learning for robots, 1994, CSLI Publications, pp. 1–2.*

Kanehiro et al., Development of a two–armed bipedal robot that can walk and carry objects, 1996, IEEE, pp. 23–28.*

Mizoguchi et al., Human–robot collaboration in teh smart office environment, 1999, IEEE, pp. 79–84.*

* cited by examiner

LEGGED ROBOT AND METHOD FOR TEACHING MOTIONS THEREOF

BACKGROUND OF THE INVENTION

1. Field of the Invention

The present invention relates to polyarticular robots such as legged robots having trunks with upper and lower limbs, and to methods for teaching motions to the polyarticular and legged robots. In particular, the present invention relates to a legged robot which performs various motion-patterns by using the limbs and/or trunk thereof, and to a method for teaching motions to the legged robot.

More particularly, the present invention relates to a method for teaching predetermined motions to the legged robot by a user of the robot which performs various motion-patterns by using the limbs and/or trunk of the robot, in which teaching of the predetermined motions can be easily performed without understanding of the operation environment of the legged robot and skills in operation thereof.

2. Description of the Related Art

A mechanical apparatus, which performs movements similar to those of a human being by using electrical and/or magnetic effects, is called a "robot". The term "robot" is said to be originated from a Slavic word "robota" which means a slave-machine. In Japan, the robots started to be widely used in the late 1960s, most of which were industrial robots, such as manipulators and transfer robots, serving for automated and unmanned manufacturing operations in factories.

A stationary robot, such as an arm-type robot which is fixed so as to be used in a particular place, is operated only in a limited small working area such as for assembly and selection of component parts. On the other hand, a mobile type robot can operate in an unlimited working area, is movable along a predetermined working path or unlimited working path, and performs a predetermined or any operation on behalf of human beings, so as to provide various wide services which replace for those offered by live bodies including human beings, dogs, and others. Particularly, a movable legged robot is superior to the other mobile type robots, in that a flexible walking or traveling motion, such as ascending and descending steps and chairs and climbing over barriers, is possible regardless of the condition of walking or traveling area of the legged robot, although attitude control and movement control are difficult because the legged robot is instable compared with a crawler-type robot or a robot having tires.

Recently, studies have been advanced concerning robots having legs such as a pet-type robot which copies the physical mechanism and motions of four-legged animals such as cats and dogs and a "man-shaped" or "man-type" (humanoid) robot which is designed by using the physical mechanism and motions of two-legged lives, such as human beings, as models, and practical applications of these robots have been more expected.

The significance of the studies and developments of legged robots so-called humanoid robots may be explained from two points of view described below.

One is a human-scientific viewpoint. By manufacturing a robot having a structure similar to the upper and lower limbs of human beings and devising a control method of the robot, the mechanism of natural motions of walk or the like of human beings can be made clear in an engineering point of view through a process of simulation of the walking motions of the human beings. The result of these studies may contribute to the advance of various other studies concerning the mechanism of motions of human beings, such as human engineering, rehabilitation engineering, and sports science.

The other one is the development of robots for practical use, which serves as partners of human life, that is, the robots serve to support human beings in various occasions at home and in other daily life. Such robots must be more developed in their functions by learning to adapt themselves, by being taught by the human beings in various occasions in the daily life, to the different characteristics of the human beings and the different environment. It is understood that the human being and the robot can effectively and smoothly communicate with each other when the robot is "man-shaped", that is, when the robot has the same shape or structure as that of the human being.

For example, when teaching a robot in a practical operation how to traverse a room by dodging obstacles which the robot should not step on, it is far easier for a user (operator) to teach a two-legged robot having the same shape as that of the user than to teach a robot having a shape differing from that of the user, such as a crawler-type robot or a four-legged robot, and it is easier for the robot to be taught (see Takanishi, "Control of a two-legged robot" KOUSHOU by Kanto Branch of Society of Automotive Engineers of Japan, Inc., No. 25 (April, 1996)).

The action of giving lessons to a robot in predetermined motions is called "teaching". Methods of teaching the motions are, for example, those in which an operator or a user teaches the robot by holding the same by hands and feet at a workshop and in which motion patterns are inputted, produced, and edited in an external editor of the robot such as a computer.

However, in the known robot, the user has been required to have a considerably high level of understanding of the operation environment of the robot and skills in operation thereof for teaching the motions thereto; therefore, the load on the user has been great.

In recent years, research and development of intelligent robots have been advanced, the robots being capable of independently acting by forming and modifying an action plan by themselves in a stand-alone state, that is, in a state in which a command from the user is not inputted. However, such intelligence of the robots has not been sufficiently utilized in teaching motions.

SUMMARY OF THE INVENTION

Accordingly, it is an object of the present invention to provide a legged robot and a method for teaching motions to the legged robot, the legged robot being capable of performing various motion patters by using its upper and lower limbs and/or trunk.

It is another object of the present invention to provide a method for teaching motions to a legged robot capable of performing various motion patterns by using its upper and lower limbs and/or trunk, in which a user of the legged robot can teach predetermined motions by using the intelligence of the legged robot.

It is still another object of the present invention to provide a method for teaching motions to a legged robot, in which the user can easily teach the predetermined motions without understanding of the operation environment and skills in operation of the legged robot.

To these ends, according to a first aspect of the present invention, a legged robot comprises a driving member including at least one movable leg part; an actual-motion processing unit for processing motion-exhibit which is performed by the driving member; a user-input unit for inputting instructions from a user; a language processing unit for language interpretation of the input from the user via the user-input unit; and an action-control unit for controlling an action in accordance with a result of language-processing of the input from the user.

The legged robot according to the present invention may further comprise a basic motion database storing basic motion programs in which basic motions to be exhibited by the driving member are recorded; and a teaching motion database for registering teaching motion programs which are each formed with a time-series combination of at least one motion program. The action-control unit may extract the corresponding motion programs from the basic motion database and/or the teaching motion database in accordance with the result of language-processing of the input from the user, and input the extracted motion programs to the actual-motion processing unit, whereby the motion-exhibit is performed by the driving member.

The legged robot may further comprise a motion-simulation unit for confirming the stability of motions by performing simulation of a motion program to be inputted to the actual-motion processing unit. The legged robot may further comprise a warning unit for warning the user of a result of the simulation performed by the motion-simulation unit.

The action-control unit may extract the corresponding motion programs from the basic motion database and/or the teaching motion database in accordance with the result of language-processing of the input from the user, and edit a new teaching motion program by using a time-series combination of the motion programs extracted from the basic motion database and/or the teaching motion database.

The action-control unit may give a name to the newly edited teaching motion program, the name being obtained in accordance with the result of language processing of the input from the user. The action-control unit may register the named teaching motion program in the teaching motion database, extract the teaching motion program in response to the language interpretation of the input of the name from the user, and input the extracted teaching motion program to the actual-motion processing unit, whereby the motion-exhibit is performed by the driving member.

The user-input unit may comprise at least one of a voice input device, a contact-pressure-sensitive sensor, an image input device, and an attitude sensor, and the legged robot may further comprise a meaning conversion unit for converting the meaning of contents inputted by the contact-pressure-sensitive sensor, the image input device, or the attitude sensor.

According to a second aspect of the present invention, a method, for teaching motions to a legged robot which comprises a driving member including at least one movable leg part and actual-motion processing unit for processing motion-exhibit which is performed by the driving member, comprises the steps of user-inputting for accepting an input from a user; language-processing for language interpretation of the input from the user; and teaching-motion-editing for producing and editing teaching motions in accordance with a result of language-processing of the input from the user.

In the method for teaching motions to a legged robot, the legged robot may further comprise a basic motion database storing basic motion programs in which basic motions to be exhibited by the driving member are recorded, and a teaching motion database for registering first teaching motion programs which are each formed with a time-series combination of at least one motion program. In the teaching-motion-editing step, the corresponding motion programs may be extracted from the basic motion database and/or the teaching motion database in accordance with the result of language processing of the input from the user, and a second teaching motion program may be edited by using a time-series combination of the extracted motion programs.

The method for teaching motions to a legged robot may further comprise the step of actual-motion-processing for extracting the corresponding motion programs from the basic motion database and/or the teaching motion database in accordance with the result of language-processing of the input from the user, and inputting the extracted motion programs to the actual-motion processing unit, whereby the motion-exhibit is performed by the driving member.

The method for teaching motions to a legged robot may further comprise the step of motion-simulating for confirming the stability of motions by performing simulation of the motion program to be used for the motion-exhibit in the actual-motion-processing step. The method for teaching motions to a legged robot may further comprise the step of warning the user of a result of the simulation performed in the motion-simulating step.

In the method for teaching motions to a legged robot, a name may be given to the newly edited teaching motion program in the teaching-motion-editing step, the name being obtained in accordance with the result of language processing of the input from the user. In the teaching-motion-editing step, the named teaching motion may be registered in the teaching motion database. The method may further comprise the step of extracting the teaching motion program in response to the language interpretation of the input of the name from the user, and inputting the extracted teaching motion program to the actual-motion processing unit, whereby the motion-exhibit process is performed.

Input in the form of at least one of voice, contact pressure, image, and attitude may be accepted in the user-inputting step. The method may further comprise the step of meaning-converting for converting the meaning of the input in the form of contact-pressure, image, or attitude.

According to the present invention, a legged robot and a method for teaching motions to the legged robot can be provided, in which the legged robot can perform various motion patters by using its upper and lower limbs and/or trunk.

According to the present invention, a method for teaching motions to a legged robot capable of performing various motion patterns by using its upper and lower limbs and/or trunk can be provided, in which a user of the legged robot can teach predetermined motions by using the intelligence of the legged robot.

According to the present invention, a method for teaching motions to a legged robot can be provided, in which the user can easily teach the predetermined motions without understanding of the operation environment and skills in operation of the legged robot.

The legged robot according to the present invention is provided with a plurality of basic motion programs. The legged robot can recognize and language-process voice instructions inputted by the user, and perform meaning interpretation and language processing of image inputs and other sensor-inputs, thereby specifying requirements of the user.

At least one required basic motion is extracted and is combined in a time series, whereby a teaching motion program for realizing a series of expressive motions can be produced.

The produced teaching motion program is database-controlled and is combined with the basic motion program, whereby a more sophisticated and complex teaching program can be edited.

Therefore, the user can teach motions to the legged robot in the same way as in giving lessons to children in dancing, without understanding of complex operating method and skills in operation of the legged robot, by using the intelligence of the legged robot.

Further objects, features, and advantages of the present invention will become apparent from the following detailed description of the embodiments according to the present invention with reference to the attached drawings.

DESCRIPTION OF THE PREFERRED EMBODIMENTS

Embodiments according to the present invention are described below with reference to the drawings.

Figure 1:
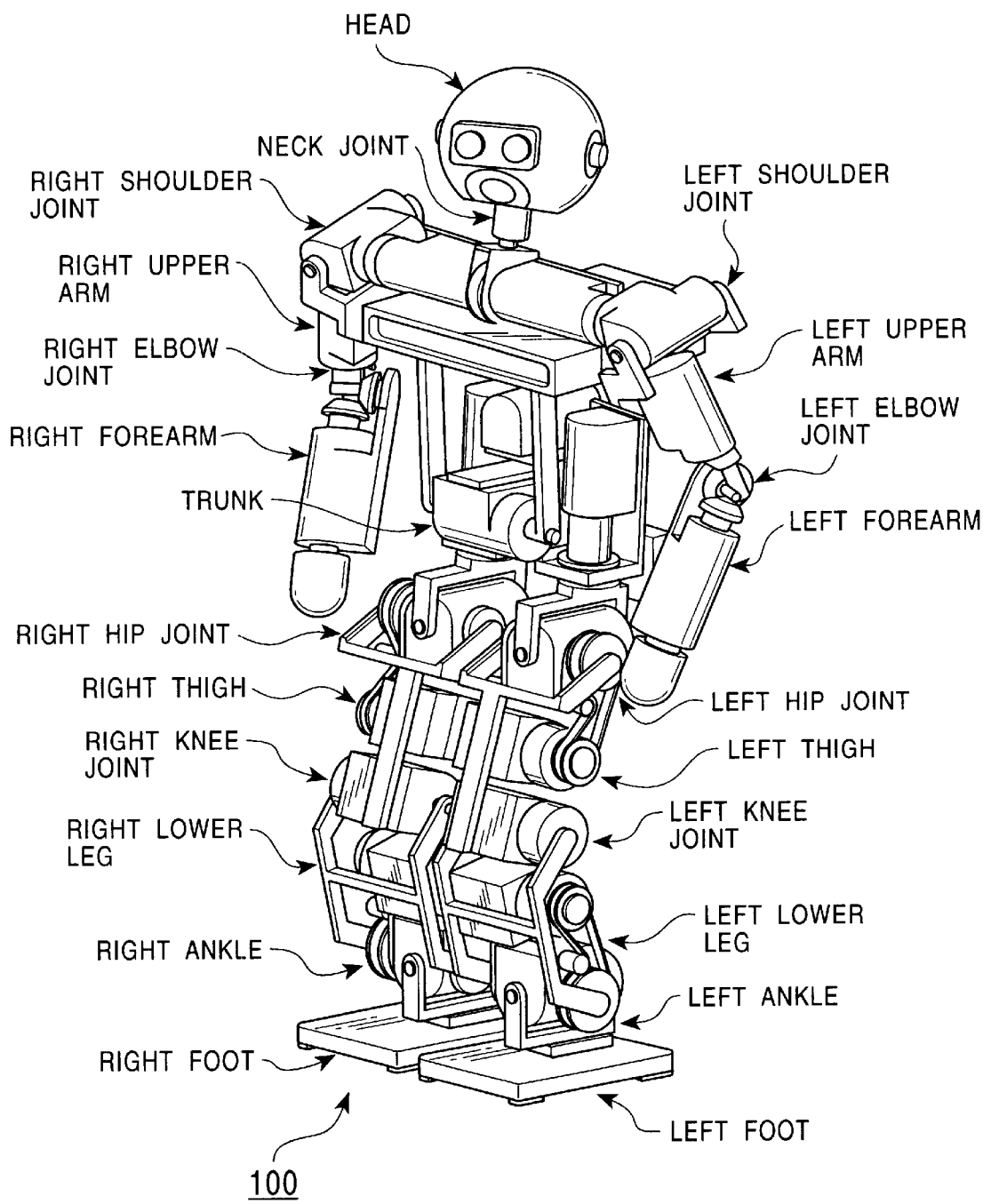
FIG. 1 is a front view of a legged robot 100 according to an embodiment of the present invention.
Figure 2:
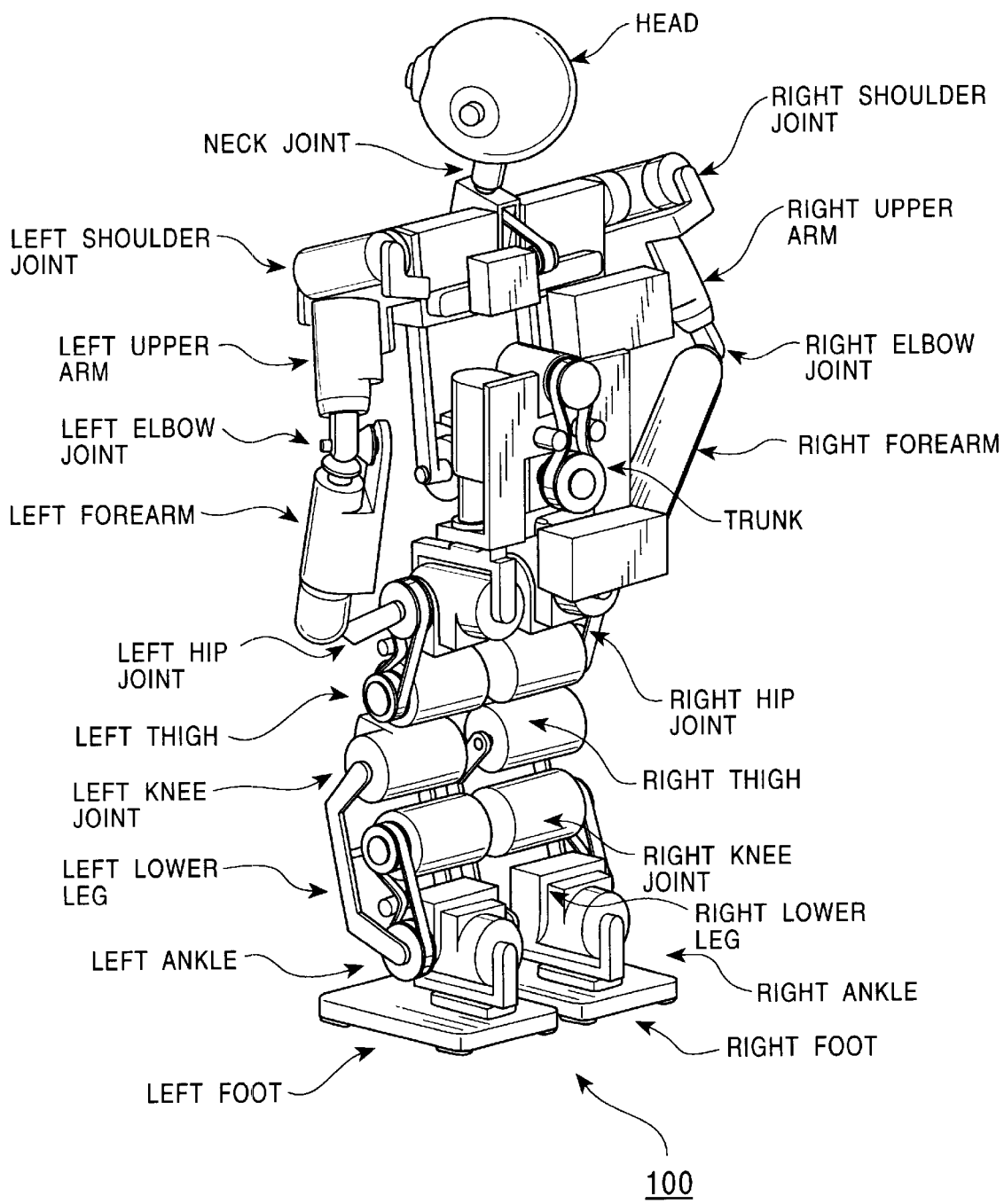
FIG. 2 is a rear view of the legged robot 100 according to the embodiment of the present invention.

FIGS. 1 and 2 are front and rear views, respectively, of a standing "man-shaped" or "man-type" legged robot 100 according to an embodiment of the present invention. The legged robot 100 includes two lower limbs for walking, a trunk, two upper limbs, and a head.

The two lower limbs each include a thigh, a knee joint, a lower leg, an ankle, and a foot, each lower limb being connected to the trunk via a hip joint substantially at the lower end of the trunk. The two upper limbs each include an upper arm, an elbow joint, and a forearm, each upper limb being connected to the trunk via a shoulder joint at a side of the upper end of the trunk. The head is connected to the trunk via a neck joint substantially at a central part of the upper end of the trunk.

A trunk member is provided therein with a control unit which is not shown in FIGS. 1 and 2. The control unit which is received in a casing includes a controller (main control unit) for drive-control of joint-actuators and for processing inputs from the outside via sensors (described below), power-source circuit, and other peripheral devices. The control unit may also include communication interface and communication apparatus for remote control.

Figure 3:
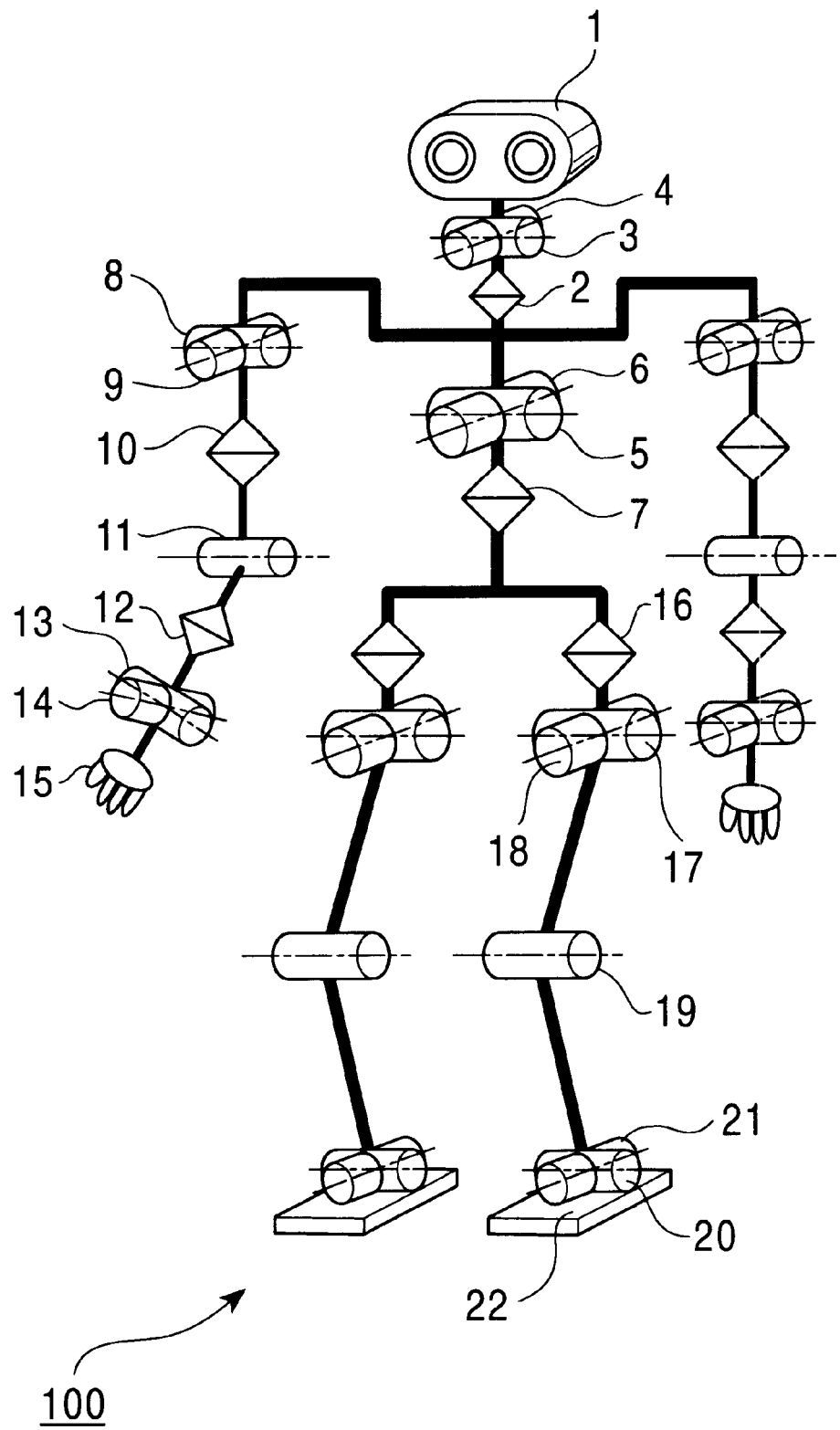
FIG. 3 is a schematic view of a model showing the degree of freedom of the legged robot 100 according to the embodiment.

FIG. 3 is a schematic view of a model showing the degree of freedom of the legged robot 100 according to the present embodiment. The legged robot 100 includes the two upper limbs, a head 1, the two lower limbs for walking, and the trunk which connects the upper limbs and the lower limbs.

The neck joint supporting the head 1 has three degrees of freedom of movement at a neck-joint yaw axis 2, a neck-joint pitch axis 3, and a neck-joint roll axis 4.

Each upper limb has degrees of freedom at a shoulder-joint pitch axis 8, a shoulder-joint roll axis 9, an upper-arm yaw axis 10, an elbow-joint pitch axis 11, a forearm yaw axis 12, a wrist-joint pitch axis 13, a wrist-joint roll axis 14, and a hand 15. The hand 15 including a plurality of fingers actually has a polyarticular structure having a multidegree of freedom of movement. However, the degree of freedom of the hand 15 is set to zero in the present embodiment because the motion of the hand 15 does not greatly contribute to or affect attitude-stability-control and walking-motion-control of the legged robot 100. Therefore, each upper limb has seven degrees of freedom of movement, according to the present embodiment.

The truck has three degrees of freedom movement at a trunk pitch axis 5, a trunk roll axis 6, and a trunk yaw axis 7.

The lower limbs each have degrees of freedom at a hip-joint yaw axis 16, a hip-joint pitch axis 17, a hip-joint roll axis 18, a knee-joint pitch axis 19, and an ankle-joint pitch axis 20, an ankle-joint roll axis 21, and a foot (sole of a foot) 22. The intersections between the hip-joint pitch axes 17 and the hip-joint roll axes 18, respectively, define the positions of the hip joints of the legged robot 100 according to the present embodiment. Each foot of a human body has a polyarticular structure having a multidegree of freedom of movement. However, the degree of freedom of each foot 22 of the legged robot 100 is set to zero, according to the present embodiment. Therefore, each lower limb has six degrees of freedom of movement, according to the present embodiment.

The overall legged-robot 100 according to the present embodiment has 3+7×2+3+6×2=32 degrees of freedom of movement. However, the number of degrees of freedom of the legged robot 100 is not limited to thirty-three, and the degree of freedom, that is, the number of joints may be increased or decreased as required in designing and manufacturing and according to the required specifications.

The above-described degrees of freedom at the joints of the legged robot 100 are practically represented in actions of the actuators. The joint-actuators are preferably small and lightweight because the appearance of the legged robot 100 must be free from unnatural projections so as to resemble a human being and due to-various requirements so that position-control of the movement of an instable two-legged robot can be easily performed. According to the present embodiment, small direct-gear-coupling-type ac servo-actuators, in which one-chip servo-control systems are built in motor units, are mounted. The small ac servo-actuator applicable to a legged robot is disclosed in, for example, Japanese Patent Application No. 11-33386, the right of which has been transferred to the assignee of the present invention.

Figure 4:
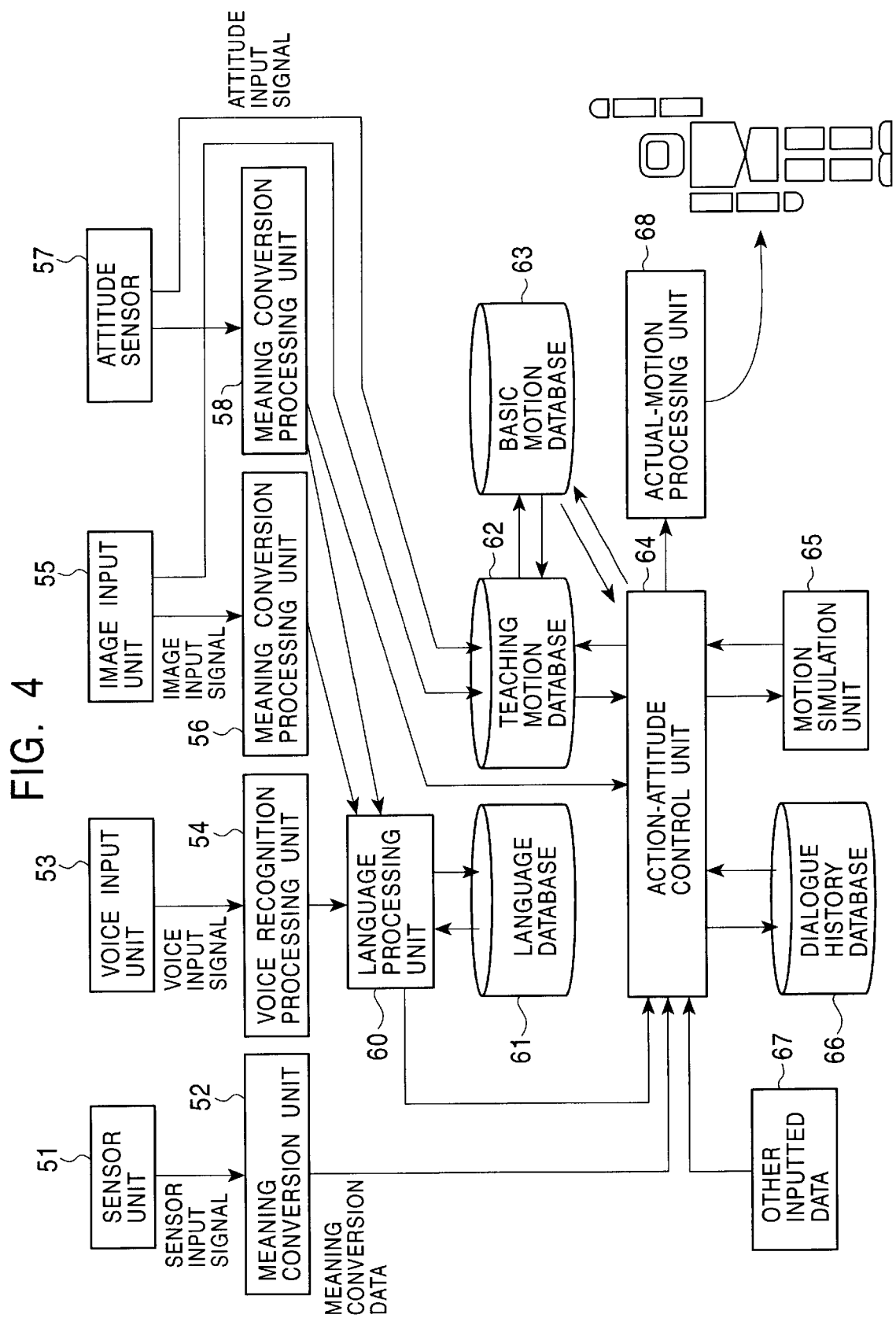
FIG. 4 is a block diagram of a control system of the legged robot 100 according to the embodiment.

FIG. 4 is a block diagram of a control system of the legged robot 100 according to the present embodiment.

The legged robot 100 is provided with user-input units for command-inputs from the user and for inputs of change of the external environment, which are a sensor unit 51, a voice input unit 53, an image input unit 55, and an attitude sensor 57.

The sensor unit 51 includes, for example, contact sensors and pressure sensors which are disposed scattering in the overall legged robot 100. When an external force of, for example, "gently rubbing" or "striking" is applied to the legged robot 100 by the user, a sensor-input signal is supplied to a meaning conversion unit 52. The meaning conversion unit 52 interprets or assumes the meaning which is implied by the action of the user of "gently rubbing" or "striking", converts the sensor-input signal into text-formatted meaning conversion data, and outputs the data to a language processing unit 60.

The voice input unit 53 is formed with, for example, a microphone which is mounted on the head 1. A voice-recognition processing unit 54 recognizes the voice of the user inputted via the voice input unit 53 as text-formatted data and outputs the data to the language processing unit 60.

The image input unit 55 is formed with, for example, an imaging device such as a CCD (charge coupled device). An image of, for example, an action, behavior, or gesture of the user is supplied to a meaning conversion processing unit 56. The meaning conversion processing unit 56 interprets or assumes the meaning which is implied by the action, behavior, or gesture of the user, converts the input into text-formatted meaning conversion data, and outputs the data to the language processing unit 60. An image-input of visible identification data of which the language-form meaning has been defined (for example, "CyberCode" of Sony Corporation) can be processed for the meaning conversion simultaneously with image recognition.

The attitude sensor 57 includes gyro-sensors and acceleration sensors mounted to the trunk of the legged robot 100, and encoders disposed in the vicinity of the respective joint-actuators. Fog example, the motions and behavior of the user of teaching the legged robot 100 by holding the same by the hands and feet are supplied to a meaning conversion processing unit 58. The meaning conversion processing unit 58 interprets or assumes the meaning which is implied by the motions and behavior of the user applied to the legged robot 100, converts the input into a language-form meaning-conversion data, and outputs the same to the language processing unit 60. When the motion patterns of teaching the legged robot 100 by holding the same by the hands and feet which are inputted via the attitude sensor 57 are teaching motions, the inputted data are outputted to an action-attitude control unit 64. Although the user-inputs are the same as each other, the teaching motion to the legged robot 100 and the motion to be exhibited by the legged robot 100 differ from each other according to the attitude of the legged robot 100.

The language processing unit 60 processes analysis of the text-formatted user-input by using a language database 61. More particularly, the language processing unit 60 divides the text data into units of words according to a morphemic analysis or the like, obtains language data such as syntactic data and cross-talk data according to a syntactic analysis and a cross-talk meaning analysis, and outputs the language data to the action-attitude control unit 64.

A basic motion database 63 stores basic motion programs in advance (for example, before shipment) with which the legged robot 100 should be provided as a matter of course. The basic motion programs are formed with smallest divisible basic units of motion, such as "to raise right hand" or "to raise left hand".

In the legged robot 100 according to the present embodiment, a teaching motion program which realizes a series of expressive motions can be produced by combining at least one basic motion program in a time series. The teaching motion programs are stored in a teaching motion database 62. More sophisticated and complex teaching programs can be each edited by combining the teaching motion programs and the basic motion programs.

The action-attitude control unit 64 is a functional module which generally controls the actions and attitude, which the legged robot 100 should perform, in accordance with the language data obtained from the user-input such as voice. Major functions of the action-attitude control unit 64 are described below.

(1) To extract the corresponding basic motion programs from the basic motion database 63 in accordance with the language data obtained from the user-input.

(2) To produce a teaching motion program by combining the basic motion programs in a time series which have been extracted in accordance with language data obtained from the user-input, and to register the produced teaching motion program in the teaching motion database 62.

(3) To extract the corresponding teaching motion programs from the teaching motion database 62 in accordance with the language data obtained from the user-input.

(4) To edit a teaching motion program by combining the basic motion programs and the teaching motion programs in a time series, the basic motion programs and the teaching motion programs being extracted in accordance with the language data obtained from the user-input, and to register the edited teaching motion program in the teaching motion database 62.

The motion programs which the action-attitude control unit 64 has extracted from the teaching motion database 62 and/or the basic motion database 63 are transferred to an actual-motion processing unit 68. The actual-motion processing unit 68 computes rotation amounts and speeds of the joint-actuators serving to realize the motion programs, and sends control-commands and control-parameters to drive-controllers of the joint-actuators.

A motion simulation unit 65 is a functional module for simulating the motion programs. The motion simulation unit 65 performs simulation when the action-attitude control unit 64 carries out the produced and edited teaching motion programs, whereby the stability of motions can be confirmed, for example, whether or not the teaching motion programs are acceptable to the legged robot 100 regarding the mechanical and electrical capabilities thereof, whether or not the legged robot 100 tumbles down during motion-exhibit, and whether or not driven units interfere with each other.

A dialogue history database 66 is a functional module for time-sequentially controlling contents of dialogue (for example, proper nouns and objects used in the dialogue) between the legged robot 100 and the user, which are inputted via the user-input units such as the voice input unit 53. The action-attitude control unit 64 may select the motion programs to be extracted by considering the dialogue history.

The action-attitude control unit 64 may select the motion programs to be extracted in accordance with inputted data 67 other than those described above. The other inputted data 67 include commands sent from external computer system via a network and commands inputted via an operation panel mounted on the legged robot 100 and a remote control device.

Figure 5:
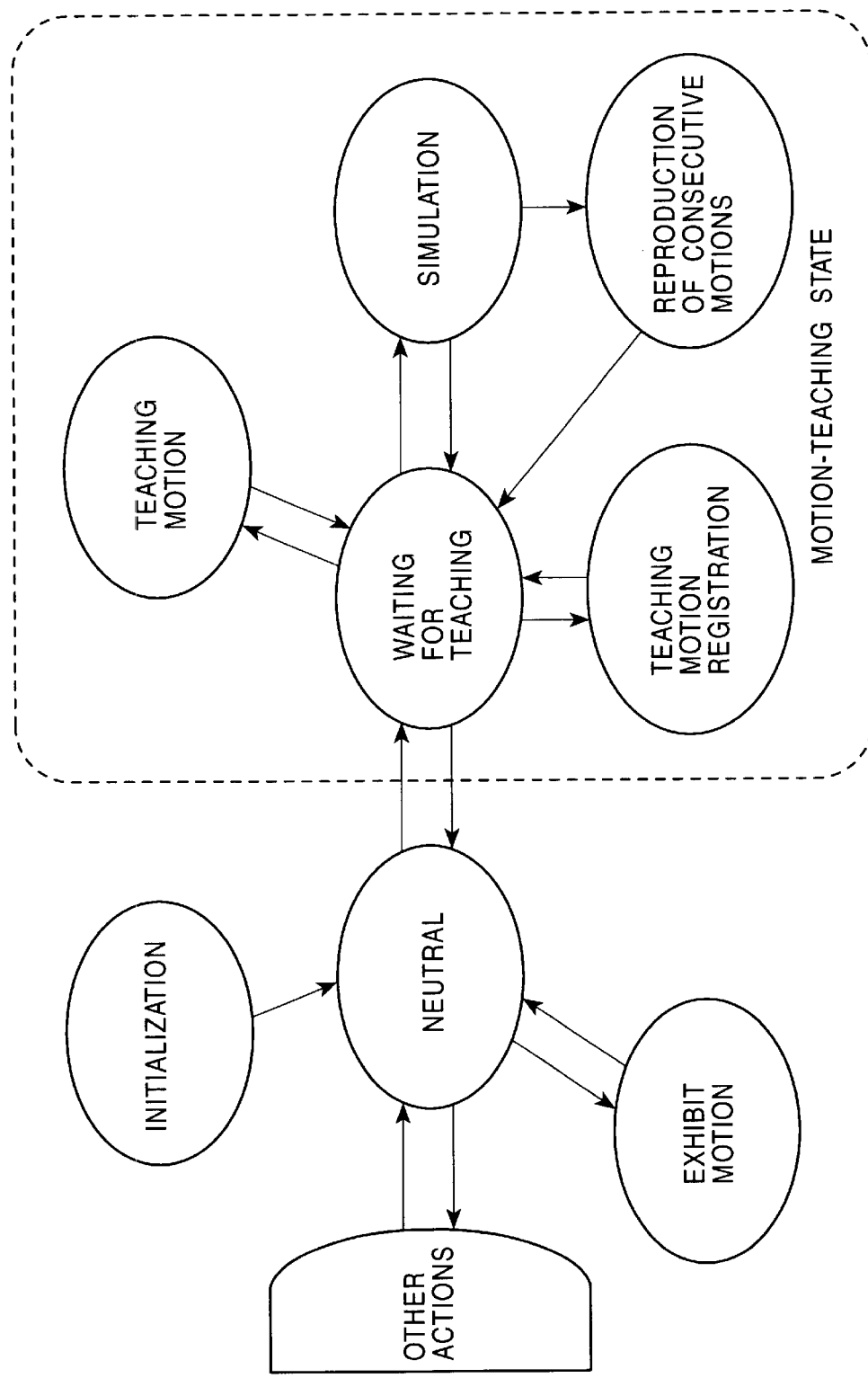
FIG. 5 is an illustration showing the state transition of the operation characteristics of the legged robot 100 according to the embodiment.

FIG. 5 is an illustration showing the state transition of the operation characteristics of the legged robot 100 according to the embodiment.

After the power is switched on and self-diagnosis and initialization are completed, the legged robot 100 transits into a neutral mode.

The legged robot 100 transits into a motion-exhibit mode and other action modes in accordance with the decision by itself according to an emotion-model and with instructions from the user such as voice.

The legged robot 100 transits into a motion teaching state when a voice-input formed with a particular text such as "motion editing" is performed or a particular operation-button (not shown) is pressed down.

The motion teaching state includes a "waiting-for-teaching" mode for waiting for teaching from the user, a "simulation" mode for simulating the teaching motion which has been taught, a "motion-reproducing", mode for reproducing, after the simulation, consecutive motions formed with a time-series combination of the basic motion programs and the teaching motion programs, a "teaching-motion-registration" mode for registering the teaching motion formed with a time-series combination of a plurality of motion programs, and a "teaching motion" mode for extracting teaching motions from the teaching motion database in accordance with instructions from the user and performing the teaching motions.

Figure 6:
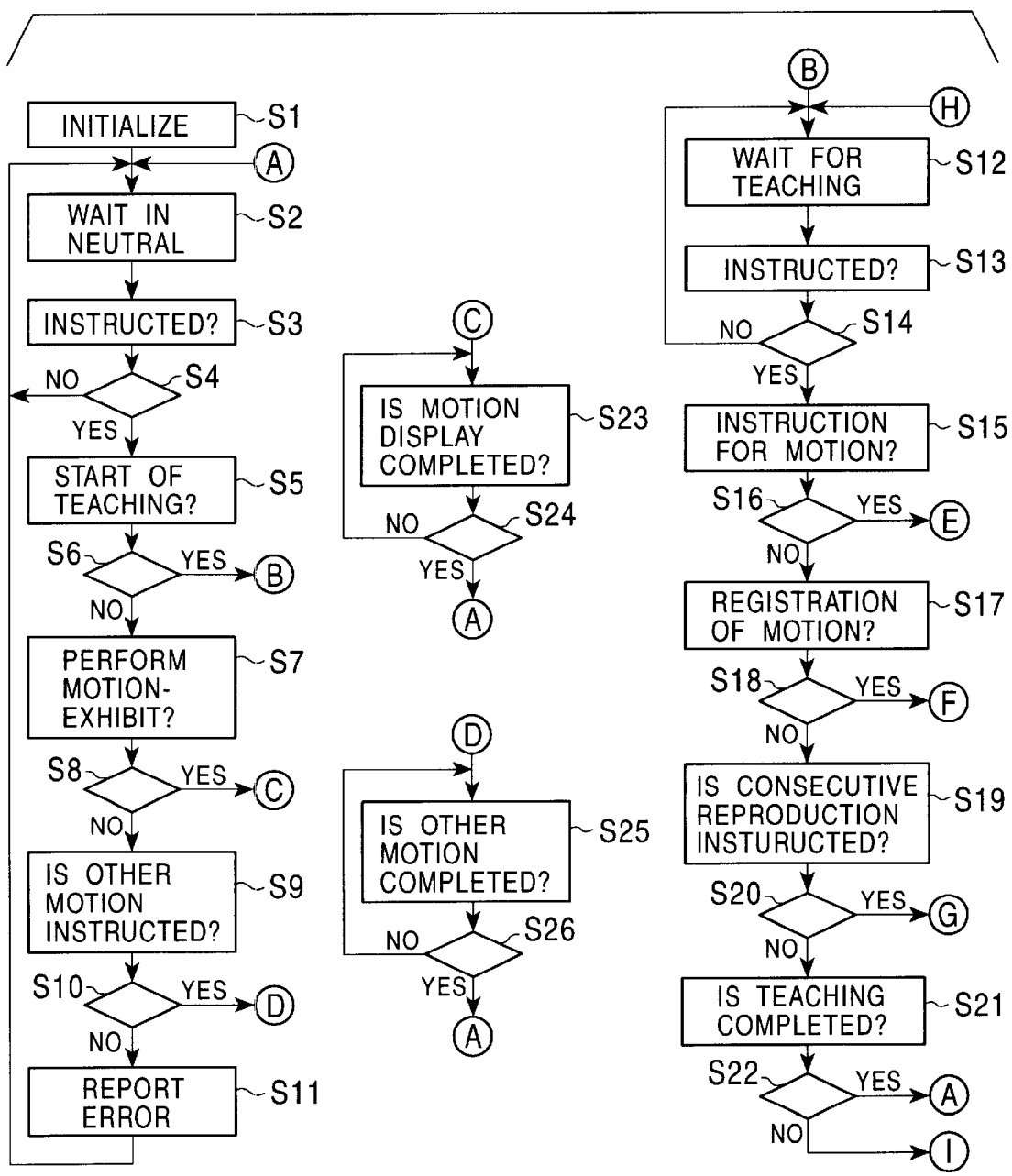
FIG. 6 is a part of a flowchart of processes performed in the legged robot 100 according to the embodiment.
Figure 7:
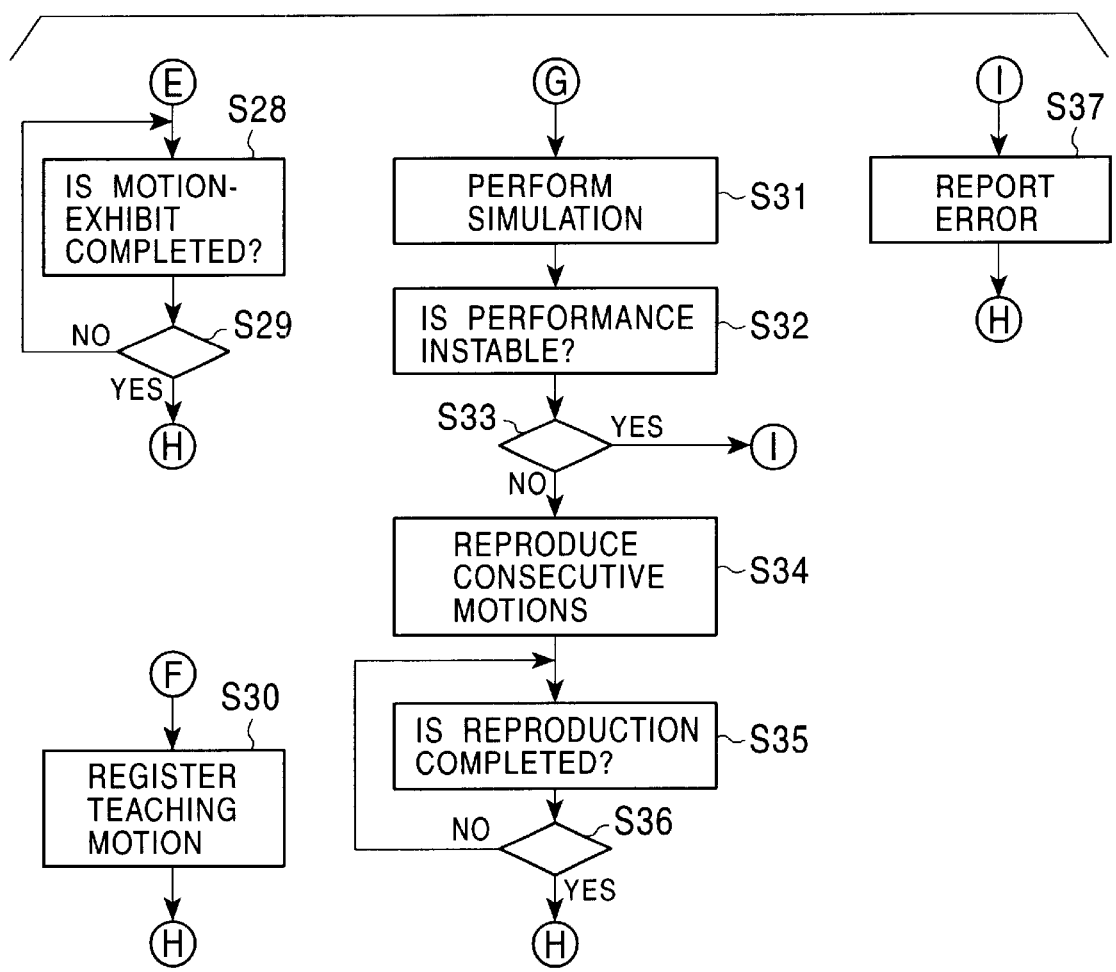
FIG. 7 is the remaining part of the flowchart of the processes performed in the legged robot 100 according to the embodiment.

In FIGS. 6 and 7, a flowchart of processes performed with the legged robot 100 according to the present embodiment is shown. The processes are described below with reference to the flowchart.

The legged robot 100 is switched on and is initialized (step S1), and waits for an instruction from the user in a neutral state (steps S2 and S3).

When the instruction from the user is inputted (step S4) in the form of voice or the like, it is determined whether or not the instruction is to start motion-teaching (steps S5 and S6).

When the instruction is not to start motion-teaching, it is determined whether or not the instruction is to perform motion-exhibit (steps S7 and S8).

When the instruction is not to perform motion-exhibit, it is determined whether or not other motion is instructed (steps S9 and S10).

When the instruction does not correspond to any of the above instructions, a process of reporting an error is performed (step S11), the error being that the instruction from the user has not been correctly interpreted. The error report is not limited to be performed in any specific manner. The report may be performed by a voice-output via a speaker, an error-report indicator may fall down, or an error message may be sent to an external computer system via a network or a wireless communication device.

Then, the process proceeds back to step S2, and the legged robot 100 waits for another instruction from the user.

When it is determined that the legged robot 100 is instructed to start motion-teaching in the determination step S6, the legged robot 100 waits for another instruction, that is, for teaching (steps S12 to S14). The instruction from the user is performed in voice or in other ways.

When the instruction for teaching is given by the user, it is determined whether or not the instruction is for motion-exhibit (steps S15 and S16).

When motion-exhibit is instructed, the instructed motion is exhibited (step S28), and the process proceeds back to step S12 after the motion-exhibit is completed (step S29), so as to wait for another instruction for motion-teaching. The motion-exhibit is performed in such a manner that the motion programs corresponding to the instruction from the user are extracted from the basic motion database 63 or the teaching motion database 62, the extracted motion programs are inputted to the actual-motion processing unit 68, whereby the motion-exhibit is processed.

When the instruction for teaching from the user is not for motion-exhibit, it is determined whether or not the instruction is for registration of motion (steps S17 and S18).

When the registration of motion is instructed, a time-series combination of a plurality of the basic motion programs and/or teaching motion programs, which have been instructed for motion-exhibit, is registered as a newly produced and edited teaching motion program in the teaching motion database 62 (step S30). The process proceeds back to step S12 for waiting for the subsequent instruction for motion-teaching.

When the instruction for teaching from the user is not for registration of motion, it is determined whether or not the instruction is for consecutive reproduction of a motion (steps S19 and S20).

When the instruction from the user is for consecutive reproduction of a motion, the instructed teaching motion program is extracted from the teaching program database 62, and is inputted to the motion simulation unit 65 (step S31), and it is determined whether or not the instructed teaching motion program corresponds to the specifications of the legged robot 100, that is, whether or not the instructed teaching motion program can be stably performed (steps S32 and S33).

When it is determined, as a result of the simulation, that the motion program cannot be stably performed, an error report is given (step S37), and the process proceeds back to step S12 for waiting for the subsequent instruction for motion-teaching. The error report is given by, for example, a voice-output via a speaker, display on an error indicator, an error message sent to an external computer system via a network or a wireless communication device.

When it is determined, as a result of the simulation, that the motion program can be stably performed, the motion program is inputted to the actual-motion processing unit 68, and the reproduction of the motion program is performed (step S34).

When the reproduction of the motion program is completed (steps S35 and S36), the process proceeds to step S12 for waiting for the subsequent motion-teaching.

When the instruction for teaching from the user is not for the consecutive reproduction, it is determined whether or not the instruction for teaching from the user is completed (steps S21 and S22).

When the instruction for teaching is completed, the process proceeds back to step S2, and the processes are repeatedly performed in the same manner as described above. When the instruction for teaching is not complete, an error-report is given (step S37).

Figure 8:
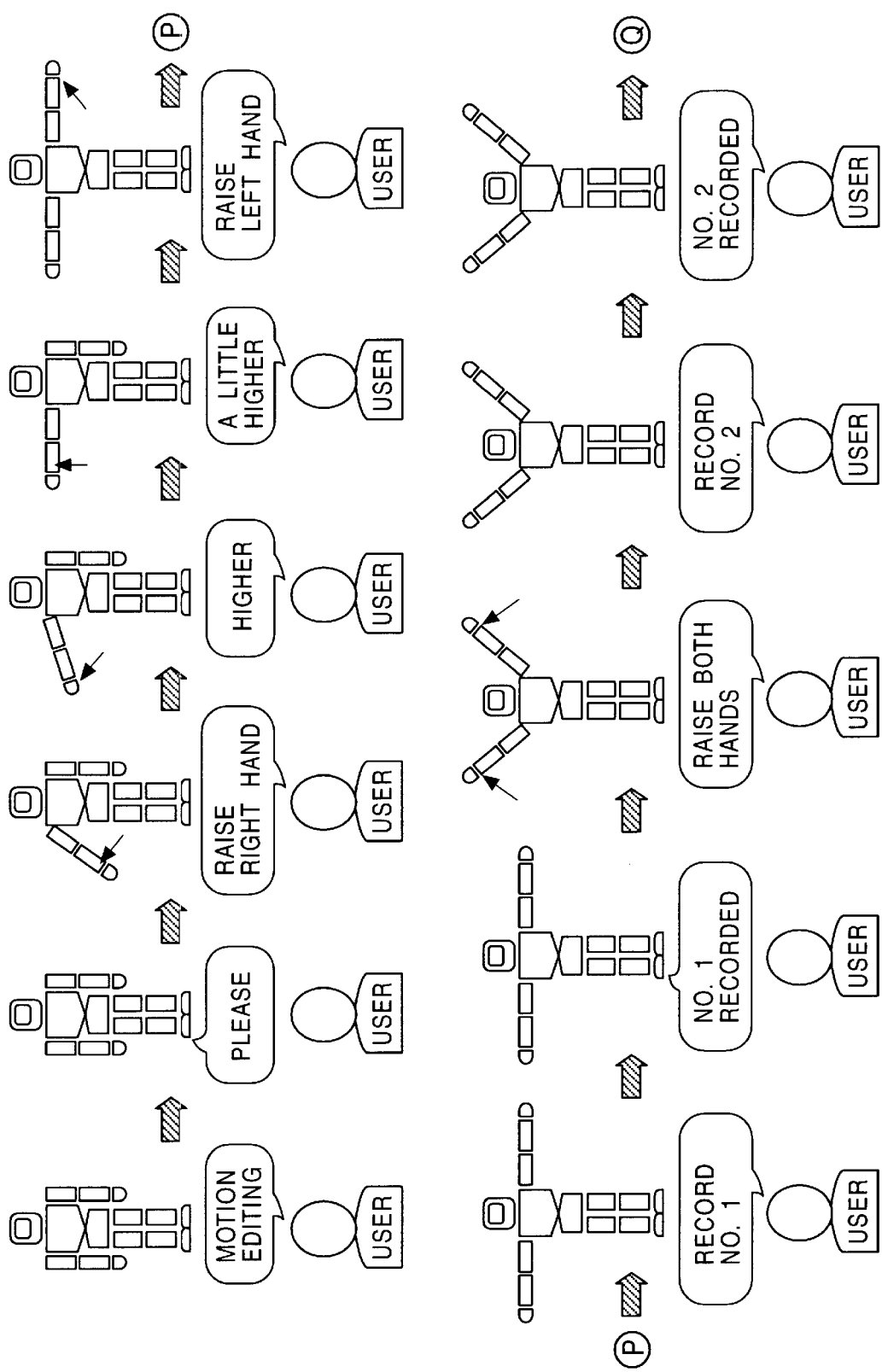
FIG. 8 is an illustration showing a transaction between the legged robot 100 and the user, in which a teaching motion for teaching a motion program is edited according to voice inputs from the user, the motion program being formed with a time-series combination of a plurality of basic motion programs, and the edited motion program is reproduced according to the voice inputs from the user.
Figure 9:
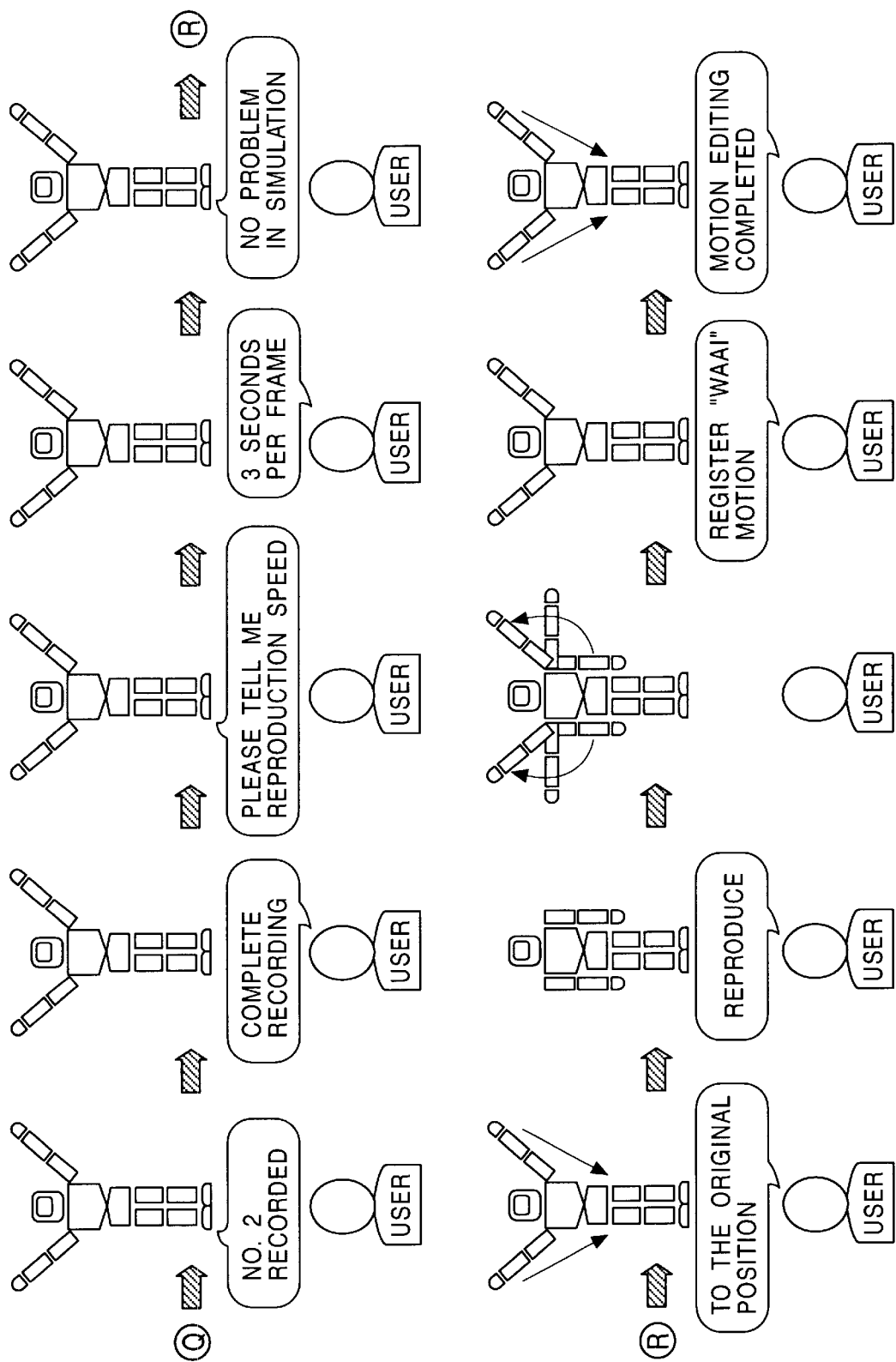
FIG. 9 is an illustration showing the transaction between the legged robot 100 and the user, in which the teaching motion for teaching the motion program is edited according to voice inputs from the user, the motion program being formed with a time-series combination of the plurality of basic motion programs, and the edited motion program is reproduced according to the voice inputs from the user.

In FIGS. 8 and 9, a transaction between the legged robot 100 and the user is schematically shown, in which a teaching motion for teaching a motion program is edited according to voice inputs from the user, the motion program being formed with a time-series combination of a plurality of basic motion programs, and the edited motion program is reproduced according to the voice inputs from the user. The motion which is edited and is reproduced is a motion "Waai" in which the legged robot 100 raises its hands, which is described below with reference to the drawings.

The user instructs for the start of teaching by voicing a phrase "motion editing". The legged robot 100 voice-recognizes the voice-input, converts the voice-input of "motion editing" into a text of "motion editing", and interprets the instruction of the user by language processing. The legged robot 100 voices a word "please" in response to the instruction from the user, and waits for teaching.

When the user voices a phrase "raise right hand", the legged robot 100 voice-recognizes the voice-input, converts the voice-input into a text of "raise right hand", and interprets the instruction of the user by language processing. The legged robot 100 extracts the corresponding basic motion program from the basic motion database 63, inputs the extracted basic motion program to the actual-motion processing unit 68, and performs a motion of raising the right hand.

The user may voice a word "higher" by observing the motion-exhibit of the legged robot 100 in which the legged robot 100 has not sufficiently raised the right hand. The legged robot 100 voice-recognizes the voice-input, converts the voice-input into a text of "higher", and interprets the instruction of the user by language processing. Then, the legged robot 100 performs a motion of raising the right hand higher in response to the instruction from the user.

When the user voices a phrase "a little higher", the legged robot 100 voice-recognizes the voice-input, converts the voice-input into a text of "a little higher", and interprets the instruction from the user by language processing. The action-attitude control unit 64 performs dialogue processing in which pronouns and objects are maintained identical in a time sequence by using dialogue history stored in the dialogue history database 66, thereby understanding the instruction of the user "to raise the right hand a little higher", whereby the legged robot 100 raises the right hand a little higher as a feedback to the user.

When the user voices a phrase "raise left hand", the legged robot 100 voice-recognizes the voice-input, converts the voice-input into a text of "raise left hand", and interprets the instruction from the user by language processing. In response to the instruction from the user, the legged robot 100 extracts the corresponding basic motion program from the basic motion database 63, inputs the extracted basic motion program to the actual-motion processing unit 68, and performs a motion of raising the left hand. The action-attitude control unit 64 performs dialogue processing in which pronouns and objects are maintained identical in a time sequence by using the dialogue history stored in the dialogue history database 66, whereby the legged robot 100 can raise the left hand to the same level as that of the right hand.

The user instructs for tentative recording of a motion program formed with a series of the teaching motions by voicing a phrase "record No. 1". The legged robot 100 voice-recognizes the voice-input, converts the voice-input into a text of "record No. 1", and interprets the instruction from the user by language processing. In response to the instruction of the user, the legged robot 100 tentatively records the teaching motion program as a sequence No. 1 motion program, and voices a phrase "No. 1 recorded" as a feedback to the user.

When the user voices a phrase "raise both hands", the legged robot 100 voice-recognizes the voice-input, converts the voice-input into a text of "raise both hands", and interprets the instruction from the user by language processing. In response to the instruction of the user, the legged robot 100 extracts the corresponding basic program from the basic motion database 63, inputs the extracted basic program to the actual-motion processing unit 68, and performs a motion of raising both hands.

The user instructs for tentative recording of a motion program for raising both hands, the motion-exhibit of which has just been performed, by voicing a phrase "record No. 2". The legged robot 100 voice-recognizes the voice-input, converts the voice-input into a text of "record No. 2", and interprets the instruction from the user by language processing. In response to the instruction of the user, the legged robot 100 tentatively records the teaching motion program as a sequence No. 2 motion program, and voices a phrase "No. 2 recorded" as a feedback to the user.

The user instructs to complete the recording operation of the teaching motions by voicing a phrase "complete recording". The legged robot 100 voice-recognizes the voice-input, converts the voice-input into a text of "complete recording", and interprets the instruction from the user by language processing.

When completing recording, the legged robot 100 voices a phrase "please tell me reproduction speed", thereby requesting instructions from the user for the speed of the reproduction of the edited and recorded motion programs. The user may respond by voicing a phrase expressing the speed, for example, "3 seconds per frame". The legged robot 100 voice-recognizes the voice-input, converts the voice-input into a text of "3 seconds per frame", and interprets the instruction from the user by language processing. The edited and recorded motion programs and the reproduction speed are inputted to the motion simulation unit 65, and are processed for computation whether or not stable motions are possible. The legged robot 100 voices a phrase, for example, "no problem in simulation", thereby feeding the result of the simulation back to the user.

The user instructs the legged robot 100 to return to the original standing position in a waiting mode by voicing a phrase "to the original position". The legged robot 100 voice-recognizes the voice-input, converts the voice-input into a text of "to the original position", and interprets the instruction from the user by language processing.

The user instructs the legged robot 100 to perform the recorded motion programs by voicing a word "reproduce". The legged robot 100 voice-recognizes the voice-input, converts the voice-input into a text of "reproduce", and interprets the instruction from the user by language processing. In response to the instruction of the user, the legged robot 100 inputs the recorded motion programs to the actual-motion processing unit 68, and performs the motion of raising both hands in three seconds.

The user instructs to name the reproduced motion "Waai" and register the reproduced motion "Waai" in the teaching motion database 62, by voicing a phrase "register 'Waai' motion". The legged robot 100 voice-recognizes the voice-input, converts the voice-input into a text of "register 'Waai' motion", and interprets the instruction from the user by language processing. In response to the instruction of the user, the legged robot 100 registers the reproduced motion programs as a motion "Waai" in the teaching motion database 62.

Lastly, the user instructs for completion of the motion editing by voicing a phrase "motion editing completed". The legged robot 100 voice-recognizes the voice-input, converts the voice-input into a text of "motion editing completed", and interprets the instruction from the user by language processing. Then, the legged robot 100 returns to the original standing position in a waiting mode. Thereafter, only by voicing the name of motion "Waai", the teaching motion program registered in the above-described operation is extracted from the teaching motion database 62, and the motion-exhibit thereof is performed by the legged robot 100.

While the present invention has been described in connection with the preferred embodiments, it will be obvious to those skilled in the art that various modifications and substitutions of the embodiments may be made without departing from the spirit and scope of the invention. That is, the present invention has been described by way of example only, and is not limited to the specific embodiments thereof, which should be determined solely by the appended claims.

What is claimed is:

1. A legged robot comprising:
a driving member including at least one movable leg part;
actual-motion processing means for processing motion-exhibit which is performed by the driving member;
user-input means for inputting instructions from a user;
language processing means for language interpretation of the input from the user via the user-input means;
action-control means for controlling an action in accordance with a result of language-processing of the input from the user; and
motion-teaching means for forming teaching motion programs by combining instructions inputted from the user into a time-series combination.

2. A legged robot according to claim 1, further comprising:
motion-simulation means for confirming a stability of motions by performing simulation of a motion program to be inputted to the actual motion processing means.

3. A legged robot comprising:
a driving member including at least one movable leg part;
actual-motion processing means for processing motion-exhibit which is performed by the driving member;
user-input means for inputting instructions from a user;
language processing means for language interpretation of the input from the user via the user-input means;
action-control means for controlling an action in accordance with a result of language-processing of the input from the user;
a basic motion database storing basic motion programs in which basic motions to be exhibited by the driving member are recorded; and
a teaching motion database for registering teaching motion programs which are each formed with a time-series combination of at least one motion program,
wherein the action-control means extracts corresponding motion programs from the basic motion database and/or the teaching motion database in accordance with the result of language-processing of the input from the user, and inputs the extracted motion programs to the actual motion processing means, whereby the motion-exhibit is performed by the driving member.

4. A legged robot comprising:
a driving member including at least one movable leg part;
actual-motion processing means for processing motion-exhibit which is performed by the driving member;
user-input means for inputting instructions from a user;
language processing means for language interpretation of the input from the user via the user-input means;
action-control means for controlling an action in accordance with a result of language-processing of the input from the user;
motion-simulation means for confirming the stability of motions by performing simulation of a motion program to be inputted to the actual motion processing means; and
warning means for warning the user of a result of the simulation performed by the motion-simulation means.

5. A legged robot comprising:
a driving member including at least one movable leg part;
actual-motion processing means for processing motion-exhibit which is performed by the driving member;
user-input means for inputting instructions from a user;
language processing means for language interpretation of the input from the user via the user-input means;
action-control means for controlling an action in accordance with a result of language-processing of the input from the user;
a basic motion database storing basic motion programs in which basic motions to be exhibited by the driving member are recorded; and
a teaching motion database for registering first teaching motion programs which are each formed with a time-series combination of at least one motion program;
wherein the action-control means extracts corresponding motion programs from the basic motion database and/or the teaching motion database in accordance with the result of language-processing of the input from the user, and edits a second teaching motion program by using a time-series combination of the motion programs extracted from the basic motion database and/or the teaching motion database.

6. A legged robot according to claim 5, wherein the action-control means gives a name to a newly edited second teaching motion program, the name being obtained in accordance with the result of language-processing of the input from the user.

7. A legged robot according to claim 5, wherein the action-control means gives a name to a newly edited second teaching motion program, the name being obtained in accordance with the result of language-processing of the input from the user, registers the named second teaching motion program in the teaching motion database, extracts the second teaching motion program in response to the language interpretation of the input of the name from the user, and inputs the extracted second teaching motion program to the actual motion processing means, whereby a motion-exhibit is performed by the driving member.

8. A legged robot comprising:
a driving member including at least one movable leg part;
actual-motion processing means for processing motion-exhibit which is performed by the driving member;
user-input means for inputting instructions from a user, said user-input means comprises at least one of a voice input device, a contact-pressure-sensitive sensor, an image input device, and an attitude sensor;
language processing means for language interpretation of the input from the user via the user-input means;
action-control means for controlling an action in accordance with a result of language-processing of the input from the user; and
meaning conversion means for converting the meaning of contents inputted by the contact-pressure-sensitive sensor, the image input device, or the attitude sensor.

9. A method for teaching motions to a legged robot comprising a driving member including at least one movable leg part and actual motion processing means for processing motion-exhibit which is performed by the driving member, the method comprising the steps of:

accepting inputs from a user;

processing said inputs for language interpretation; and producing and editing teaching motion programs by combining inputs inputted from the user into a time-series combination.

10. A method for teaching motions to a legged robot, according to claim 9, wherein the legged robot further comprises a basic motion database storing basic motion programs in which basic motions to be exhibited by the driving member are recorded, and a teaching motion database for registering teaching motion programs, and the method further comprises the steps of:

extracting the corresponding motion programs from the basic motion database and/or the teaching motion database in accordance with a result of the processing step, and inputting the extracted motion programs to the actual motion processing means, whereby the motion-exhibit is performed by the driving member.

11. A method for teaching motions to a legged robot, according to claim 10, further comprising the step of:

confirming a stability of motions by performing simulation of the motion program to be used for the motion-exhibit in the actual-motion-processing means.

12. A method for teaching motions to a legged robot, according to claim 9, wherein a name is given to the produced and edited teaching motion program in the producing and editing step, the name being obtained in accordance with a result of the processing step.

13. A method for teaching motions to a legged robot comprising a driving member including at least one movable leg part and actual motion processing means for processing motion-exhibit which is performed by the driving member, the method comprising the steps of:

user-inputting for accepting an input from a user;

language-processing for language interpretation of the input from the user; and teaching-motion-editing for producing and editing teaching motions in accordance with a result of language-processing of the input from the user;

wherein the legged robot further comprises a basic motion database storing basic motion programs in which basic motions to be exhibited by the driving member are recorded, and a teaching motion database for registering first teaching motion programs which are each formed with a time-series combination of at least one motion program; and wherein in the teaching-motion-editing step, the corresponding motion programs are extracted from the basic motion database and/or the teaching motion database in accordance with the result of language-processing of the input from the user, and a second teaching motion program is edited by using a time-series combination of the extracted motion programs.

14. A method for teaching motions to a legged robot, according to claim 13, wherein in the teaching-motion-editing step, a name is given to the newly edited second teaching motion program, the name being obtained in accordance with the result of language-processing of the input from the user, and the named second teaching motion is registered in the teaching motion database, and the method further comprises the step of:

extracting the second teaching motion program in response to the language interpretation of the input of the name from the user, and inputting the extracted second teaching motion program to the actual motion processing means, whereby the motion-exhibit process is performed.

15. A method for teaching motions to a legged robot comprising a driving member including at least one movable leg part and actual motion processing means for processing motion-exhibit which is performed by the driving member, the method comprising the steps of:

user-inputting for accepting an input from a user;

language-processing for language interpretation of the input from the user;

teaching-motion-editing for producing and editing teaching motions in accordance with a result of language-processing of the input from the user;

storing basic motion programs for basic motions to be exhibited by the driving member in a basic motion database;

registering teaching motion programs, which are each formed from a time-series combination motion programs, in a teaching motion database;

actual-motion-processing for extracting the corresponding motion programs from the basic motion database and/or the teaching motion database in accordance with the result of language-processing of the input from the user, and inputting the extracted motion programs to the actual motion processing means, whereby the motion-exhibit is performed by the driving member;

motion-simulating for confirming the stability of motions by performing simulation of the motion program to be used for the motion-exhibit in the actual-motion-processing step; and warning the user of a result of the simulation performed in the motion-simulating step.

16. A method for teaching motions to a legged robot comprising a driving member including at least one movable leg part and actual motion processing means for processing motion-exhibit which is performed by the driving member, the method comprising the steps of:

user-inputting for accepting an input from a user, said input is in the form of at least one of voice, contact-pressure, image, and attitude;

language-processing for language interpretation of the input from the user;

teaching-motion-editing for producing and editing teaching motions in accordance with a result of language-processing of the input from the user, and meaning-converting for converting the meaning of the input in the form of contact-pressure, image, or attitude.

* * * * *